United States Patent Office 2,831,866
Patented Apr. 22, 1958

2,831,866
HETEROCYCLIC COMPOUNDS

Wilfred Arthur Freeman, East Barnet, David Lord Pain, Rainham, and Ronald Slack, Chelsea, London, England, assignors to May & Baker Limited, Dagenham, Essex, England, a British company No Drawing. Application May 14, 1956
Serial No. 584,431

Claims priority, application Great Britain May 12, 1955

6 Claims. (Cl. 260—310)

This invention relates to heterocyclic compounds and more particularly to new and useful nitrosopyrazoles, a process for their production and to fungicidal compositions containing them.

According to the present invention there are provided pyridyl-4-nitrosopyrazoles of the general formula:

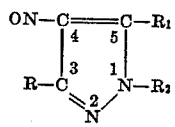

wherein R and $R_1$ are chosen from the group consisting of 4-pyridyl and lower alkyl groups containing not more than 6 carbon atoms, and $R_2$ is chosen from the group consisting of 2-pyridyl and phenyl, one of R, $R_1$ and $R_2$ being pyridyl.

The new compounds which are of low toxicity are useful agents in combatting fungi and are also active against virulent strains of *Mycobacterium tuberculosis*. They are of use in the topical treatment of pathogenic fungi of humans and cattle, particularly against ringworm caused by, for example, the following dermatophytes: *Microsporum audouini* and *Trichophyton tonsurans, discoides, quinckeanum, mentagrophytes* and *rubrum*. They are also active against fungal pathogens in plants and in particular against the chocolate spot fungus of broad beans (*Botrytis cinerea*) and *Sclerotinea laxa*.

According to a feature of the present invention, compounds of the aforesaid general formula are prepared by nitrosating a compound of the general formula

R.CO.CH$_2$.CO.R$_1$ and condensing the resulting isonitrosoketone

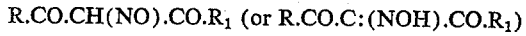
R.CO.CH(NO).CO.R$_1$ (or R.CO.C:(NOH).CO.R$_1$)

with hydrazine or a substituted hydrazine of the formula NH$_2$NHR$_2$ wherein R, R$_1$ and R$_2$ are as defined above. When R$_2$ is other than hydrogen and R is not the same as R$_1$ two isomers may be formed and, if required, isolated.

The present invention includes within its scope fungicidal preparations containing the new compound in association with a diluent or carrier which may be either a solid material or a liquid. The precise mode of formulation and nature of diluent will vary according to the intended purpose of the composition. For therapeutic application, formulations of the type customary for the topical application of anti-fungal compounds will be employed; examples are solutions (paints) in volatile solvents and creams. For horticultural purposes, again formulations of conventional type are applicable; by way of illustration an aqueous suspension containing a wetting agent is a convenient formulation for spraying. Whichever type of formulation is employed, it is preferred that the concentration of the active compound shall be not less than 0.05% by weight, based upon the total weight of the composition.

The invention is illustrated by the following examples in which isomeric configuration is indicated by writing the names of the compounds in alternative form, e. g. 3(5)-methyl-4-nitroso-1-phenyl-5(3)-4'-pyridyl-pyrazole.

Example I 2-pyridylhydrazine (13.5 g.) is dissolved in water (200 ml.) containing 2 N acetic acid (123 ml.) and the solution is cooled in ice. A solution of isonitrosoacetylacetone (15.9 g.) in water (90 ml.) is added slowly with stirring. The mixture is stirred for a further 1 hour and then allowed to stand at 0° C. The 3:5-dimethyl-4-nitroso-1-2'-pyridylpyrazole formed is collected and crystallised from a large volume of light petroleum (B. P. 60–80° C.) (some white insoluble solid is removed), giving turquoise needles, M. P. 93–94° C.

Example II

Isonicotinoylacetone (16.3 g.) is dissolved in water (100 ml.) containing concentrated hydrochloric acid (20 ml.) and the solution is cooled in ice. A solution of sodium nitrite (7.1 g.) in water (35 ml.) is added dropwise with stirring, keeping the temperature at 0° to 5° C. The white isonicotinoyl-isonitrosoacetone which separates is collected and crystallised from ethanol, giving colourless needles, M. P. 162° C. A mixture of this isonitroso compound (17.5 g.), phenylhydrazine (8 ml.) and ethanol (50 ml.) is heated under reflux for 30 minutes. The product is diluted to 100 ml. with ethanol, the solution is boiled with charcoal and filtered. The orange solid which separates on cooling is recrystallised from ethanol giving yellow needles of the phenylhydrazone of isonicotinoyl-isonitrosoacetone, M. P. 134–135° C. (*d*.).

The latter compound (5.5 g.) is dissolved in chlorobenzene (350 ml.) and the solution is very slowly distilled (150 ml. collected during 1½ hours). The residue is evaporated to dryness in vacuo and the 3(5)-methyl-4-nitroso-1-phenyl-5(3)-4'-pyridylpyrazole obtained crystallised from light petroleum (B. P. 60–80° C.) giving turquoise plates, M. P. 153–154° C.

Example III

A 50% by weight wettable powder was made up with the addition to the product of Example I of an inert powdered carrier in the form of a silicaceous earth and a wetting agent in the form of "Sulphonated Lorol." This powder was added to water to give a suspension containing 0.1% by weight of the active compound.

Example IV

A paint for veterinary use was prepared by dissolving 0.5 g. of the compound of Example I in sufficient 75% industrial methylated spirit to bring the volume to 100 cc.

The preparation is particularly useful for topical application in the cure of ringworm in cattle.

Example V

A preparation in the form of a cream for topical use on the human body was made up as follows: castor oil (24 g.), stearyl alcohol (10 g.) and polyethyleneglycol (600 monostearate) were melted together at 70° C. and the mixture poured into distilled water (60 g.). This mixture was passed through a homogeniser and the very finely powdered compound of Example I (1.0 g.) was added. The cream was then milled.

We claim:
1. A pyridyl-4-nitrosopyrazole having the formula:

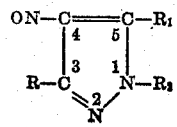

wherein R and R₁ are chosen from the group consisting of 4-pyridyl and lower alkyl groups containing not more than 6 carbon atoms, and R₂ is chosen from the group consisting of 2-pyridyl and phenyl, one of R, R₁ and R₂ being pyridyl.

2. 3:5-dimethyl-4-nitroso-1-2'-pyridylpyrazole.
3. 3-methyl-4-nitroso-1-phenyl-5-4'-pyridylpyrazole.
4. 5-methyl-4-nitroso-1-phenyl-3-4'-pyridylpyrazole.
5. A fungicidal composition containing at least 0.05% by weight of at least one pyridyl-4-nitrosopyrazole as claimed in claim 1 in association with a diluent.
6. A therapeutic composition containing, in association with a diluent, a therapeutically effective amount of a nitrosopyrazole as defined in claim 1.

References Cited in the file of this patent

UNITED STATES PATENTS 2,510,724    Sundholm _____ June 6, 1950

OTHER REFERENCES

Lund: Chem. Abstracts, vol. 29, col. 4,359 (1935).
McNew et al.: Chem. Abstracts, vol. 44, cols. 4,183–4 (1950).